United States Patent
Engi et al.

(10) Patent No.: US 11,689,666 B2
(45) Date of Patent: Jun. 27, 2023

(54) PROACTIVE AUDIO OPTIMIZATION FOR CONFERENCES

(71) Applicant: Cisco Technology, Inc., San Jose, CA (US)

(72) Inventors: Derek Engi, Ferndale, MI (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/355,352

(22) Filed: Jun. 23, 2021

(65) Prior Publication Data
US 2022/0417364 A1    Dec. 29, 2022

(51) Int. Cl.
*H04M 3/56*    (2006.01)

(52) U.S. Cl.
CPC ........ *H04M 3/568* (2013.01); *H04M 2201/41* (2013.01)

(58) Field of Classification Search
CPC .... H04M 3/568; H04M 2201/41; H04M 3/56; H04M 2203/2061; H04M 3/565; H04M 7/0027; H04M 2203/6045; H04M 2203/655; H04M 3/51; H04M 3/563; H04M 3/567; H04M 1/724; H04M 1/72403; H04M 2201/40; H04M 2203/6081; H04M 2250/02; H04M 3/2281; H04M 3/42221; H04M 1/6033; H04M 2201/22; H04M 2203/352; H04M 2203/406; H04M 2203/5072; H04M 2203/551; H04M 2203/555; H04M 2207/35; H04M 2242/30; H04M 2250/58; H04M 2250/74; H04M 3/002; H04M 3/10; H04M 3/2236; H04M 3/40; H04M 3/42068; H04M 3/42348; H04M 3/4936; H04M 3/561; H04M 3/562; H04M 3/564; H04M 7/0012; H04M 7/009; H04M 7/1225; H04M 9/082; H04L 65/403; H04L 65/1069; H04L 12/1827; H04L 65/80; H04L 12/1822; H04L 5/0044;
(Continued)

(56) References Cited

U.S. PATENT DOCUMENTS 8,558,864 B1 * 10/2013 Koller ................... H04N 7/155
 455/416
9,338,199 B2    5/2016 Paulik et al.
(Continued)

FOREIGN PATENT DOCUMENTS

WO    2019233358    12/2019

OTHER PUBLICATIONS

"Front of House", online: https://en.wikipedia.org/wiki/Front_of_house, Feb. 10, 2021, 2 pages, Wikimedia Foundation, Inc.

*Primary Examiner* — Akelaw Teshale
(74) *Attorney, Agent, or Firm* — Behmke Innovation Group; Kenneth J. Heywood; Jonathon P. Western

(57) ABSTRACT

In one embodiment, a device obtains audio data from one or more past conferences. A prediction model that predicts when participants of a conference will speak is generated based on the audio data from the one or more past conferences. The device uses the prediction model to predict a speech distribution for participants of a particular conference. Then, the device proactively optimizes audio parameters of the particular conference based on its predicted speech distribution.

18 Claims, 14 Drawing Sheets

(58) Field of Classification Search
CPC ............... H04L 12/1818; H04L 1/1887; H04L 65/4038; H04L 1/1864; H04L 65/1083; H04L 1/1858; H04L 1/206; H04L 25/0212; H04L 25/03159; H04L 5/0048; H04L 5/0053; H04L 5/0055; H04L 5/0091; H04L 65/1073; H04L 65/1076; H04L 65/607; H04L 1/0013; H04L 1/0045; H04L 1/0067; H04L 1/0071; H04L 1/1607; H04L 1/1664; H04L 1/1816; H04L 1/1819; H04L 1/1822; H04L 1/1825; H04L 1/1835; H04L 1/1861; H04L 1/189; H04L 1/1893; H04L 2025/03414; H04L 25/0224; H04L 27/2649; H04L 27/3405; H04L 27/3444; H04L 49/35; H04L 51/043; H04L 5/0046; H04L 5/0058; H04L 5/0064; H04L 5/0082; H04L 5/0094; H04L 65/1093; H04L 65/4007; H04L 65/4023; H04L 65/4092; H04L 65/601; H04L 65/604; H04L 65/605; H04L 67/10; H04L 67/306; H04L 12/1831; H04L 12/1877; H04L 12/1881; H04L 12/4641; H04L 1/00; H04L 1/0025; H04L 1/0076; H04L 1/1845; H04L 1/1867; H04L 1/188; H04L 27/2613; H04L 27/2655; H04L 27/2692; H04L 29/06027; H04L 43/50; H04L 51/02; H04L 51/24; H04L 5/0005; H04L 5/0007; H04L 5/0023; H04L 5/0035; H04L 5/005; H04L 5/0051; H04L 5/0073; H04L 5/0078; H04L 5/0087; H04L 63/0428; H04L 63/102; H04L 65/1006; H04L 65/1009; H04L 65/1046; H04L 65/105; H04L 65/1089; H04L 65/4015; H04L 65/60; H04L 65/602; H04L 67/02; H04L 67/06; H04L 69/24

See application file for complete search history.

(56) References Cited

U.S. PATENT DOCUMENTS

| | | | |
|---|---|---|---|
| 9,420,108 B1* | 8/2016 | Bostick | H04L 67/535 |
| 9,691,391 B2 | 6/2017 | Gateau | |
| 10,057,707 B2 | 8/2018 | Cartwright et al. | |
| 10,249,320 B2 | 4/2019 | Aaron et al. | |
| 10,652,655 B1* | 5/2020 | Weldemariam | H04R 27/00 |
| 10,956,117 B2* | 3/2021 | Boss | H04M 3/561 |
| 11,019,219 B1* | 5/2021 | Schuldt | H04M 9/085 |
| 2007/0133437 A1* | 6/2007 | Wengrovitz | G10L 15/26 |
| | | | 704/E15.045 |
| 2009/0282103 A1* | 11/2009 | Thakkar | H04N 21/4314 |
| | | | 709/204 |
| 2010/0020954 A1* | 1/2010 | Gilg | H04M 3/568 |
| | | | 379/202.01 |
| 2012/0166534 A1* | 6/2012 | Bentley | H04L 12/1822 |
| | | | 709/204 |
| 2014/0028789 A1* | 1/2014 | Bentley | H04M 3/56 |
| | | | 348/14.12 |
| 2015/0319309 A1* | 11/2015 | Cunico | H04M 3/568 |
| | | | 379/202.01 |
| 2016/0142674 A1* | 5/2016 | Travis | H04L 65/403 |
| | | | 348/14.07 |
| 2017/0270930 A1 | 9/2017 | Ozmeral et al. | |
| 2018/0139253 A1* | 5/2018 | Ruetschi | H04M 7/0027 |
| 2018/0143025 A1* | 5/2018 | Kurata | G01C 21/005 |
| 2018/0152487 A1* | 5/2018 | Griffin | H04L 12/1818 |
| 2018/0295240 A1* | 10/2018 | Dickins | H04M 3/568 |
| 2019/0189117 A1* | 6/2019 | Kumar | G06F 16/3329 |
| 2020/0035254 A1* | 1/2020 | Boss | G10L 15/16 |
| 2020/0065514 A1* | 2/2020 | Keen | G10L 19/018 |
| 2020/0174739 A1* | 6/2020 | Boss | H04M 3/568 |
| 2021/0227169 A1* | 7/2021 | Golan | H04N 21/4312 |

* cited by examiner

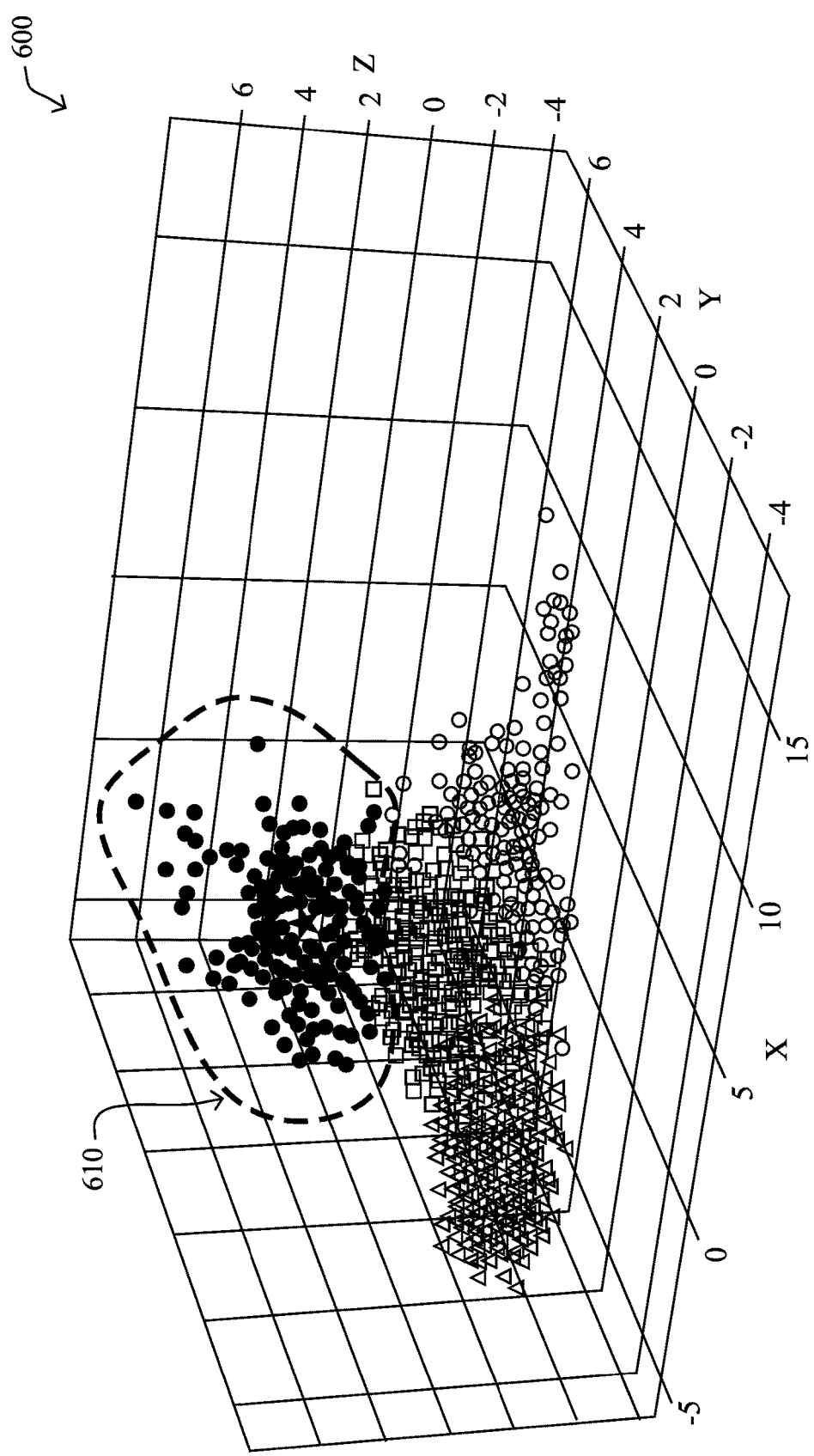

| | username | meeting_id | title | talk_time | meeting_time | w_Alice | w_Bob | w_Chuck | w_Derek | w_Eve | w_Gonzalo | w_Heidi | w_Ivan |
|---|---|---|---|---|---|---|---|---|---|---|---|---|---|
| 0 | Derek | 12345 | weekly scrum | 7.7 | 60 | 1 | 0 | 0 | 1 | 0 | 1 | 0 | 1 |
| 1 | Alice | 12345 | weekly scrum | 39.8 | 60 | 1 | 0 | 0 | 1 | 0 | 1 | 0 | 1 |
| 2 | Gonzalo | 12345 | weekly scrum | 8.2 | 60 | 1 | 0 | 0 | 1 | 0 | 1 | 0 | 1 |
| 3 | Ivan | 12345 | weekly scrum | 4.1 | 60 | 1 | 0 | 0 | 1 | 0 | 1 | 0 | 1 |
| 4 | Derek | 12355 | devops team meeting | 16.4 | 60 | 0 | 0 | 1 | 1 | 1 | 0 | 1 | 0 |
| 5 | Cuck | 12355 | devops team meeting | 14.1 | 60 | 0 | 0 | 1 | 1 | 1 | 0 | 1 | 0 |
| 6 | Heidi | 12355 | devops team meeting | 14.8 | 60 | 0 | 0 | 1 | 1 | 1 | 0 | 1 | 0 |
| 7 | Eve | 12355 | devops team meeting | 10.9 | 60 | 0 | 1 | 1 | 1 | 1 | 0 | 1 | 0 |
| 8 | Bob | 12459 | monthly sync | 18.1 | 30 | 0 | 1 | 0 | 0 | 0 | 0 | 0 | 1 |
| 9 | Ivan | 12459 | monthly sync | 11.3 | 30 | 0 | 1 | 0 | 0 | 0 | 0 | 0 | 1 |

FIG. 7

PROACTIVE AUDIO OPTIMIZATION FOR CONFERENCES

TECHNICAL FIELD

The present disclosure relates generally to techniques for audio optimization and, more particularly, to proactive audio optimization for conferences.

BACKGROUND

The share of the workforce that is working from home has increased dramatically in recent times. Collaboration between remote employees remains necessary, however. As a result, audio and video conferences have become a common and valuable resource for many businesses.

Problematically, the productivity of such conferences can suffer when audio parameters are not correctly optimized. There exists a plethora of well-known tools and techniques for audio quality enhancement including jitter buffers, echo cancelers, predictive codecs, voice activity detection, silence suppression, quality-of-service technologies, queueing variations, network probing, real-time sampling, post-processing, and so on. Additional insights may be gleaned from the pre-existing relationships between individual participants of a given meeting, particularly when the participants regularly meet together. However, none of the aforementioned solutions take into account relational data between participants to make predictive, proactive audio optimizations for an upcoming conference.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A and 6B illustrate an example two-dimensional view and three-dimensional view, respectively, of voice profile clustering;

FIG. 7 illustrates an example table of audio data 700 from one or more past conferences;

DESCRIPTION OF EXAMPLE EMBODIMENTS

Overview

Figure 1A:
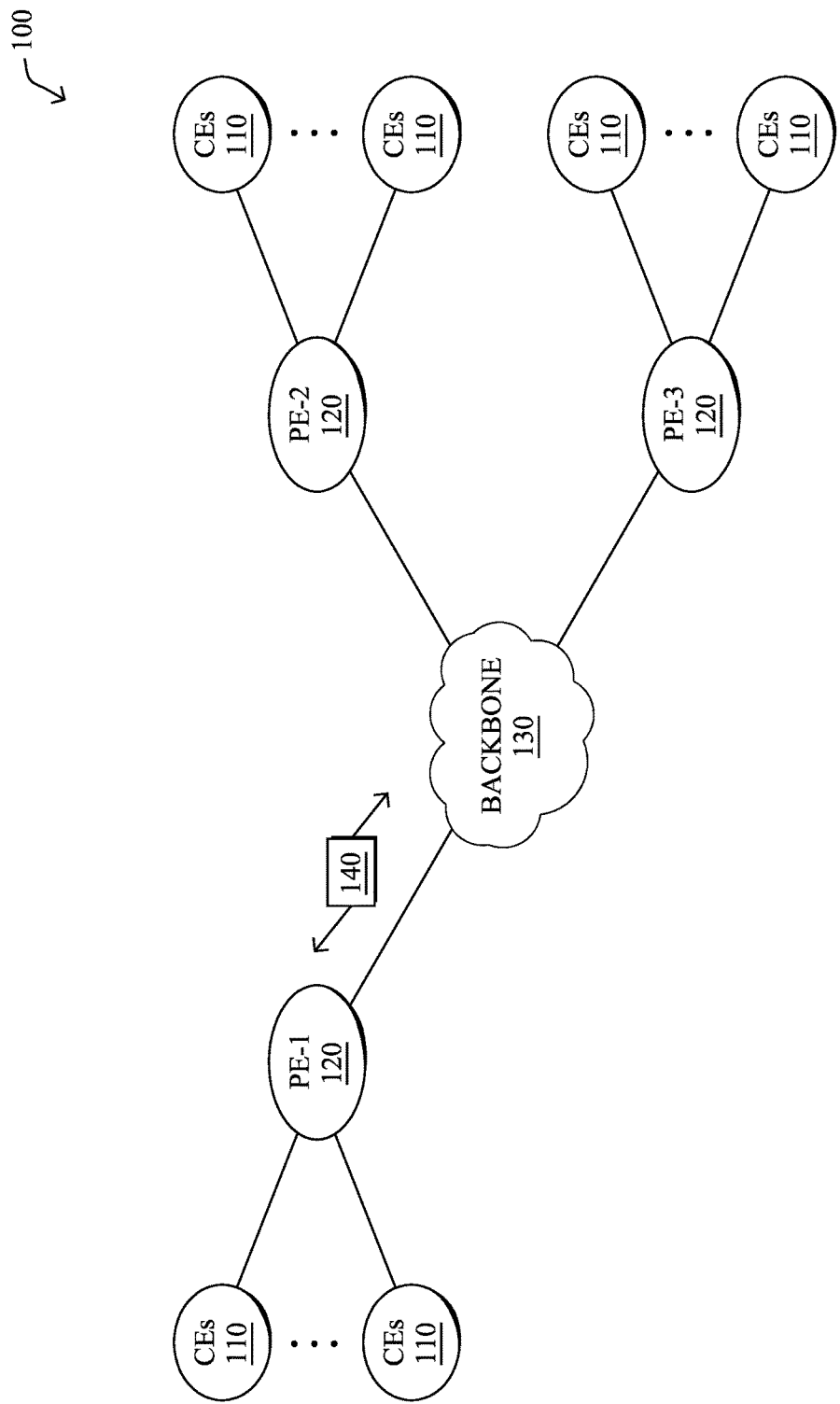
FIGS. 1A-1B illustrate an example computer network.

According to one or more embodiments of the disclosure, a device obtains audio data from one or more past conferences. A prediction model that predicts when participants of a conference will speak is generated based on the audio data from the one or more past conferences. The device uses the prediction model to predict a speech distribution for participants of a particular conference. Then, the device proactively optimizes audio parameters of the particular conference based on its predicted speech distribution.

DESCRIPTION

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
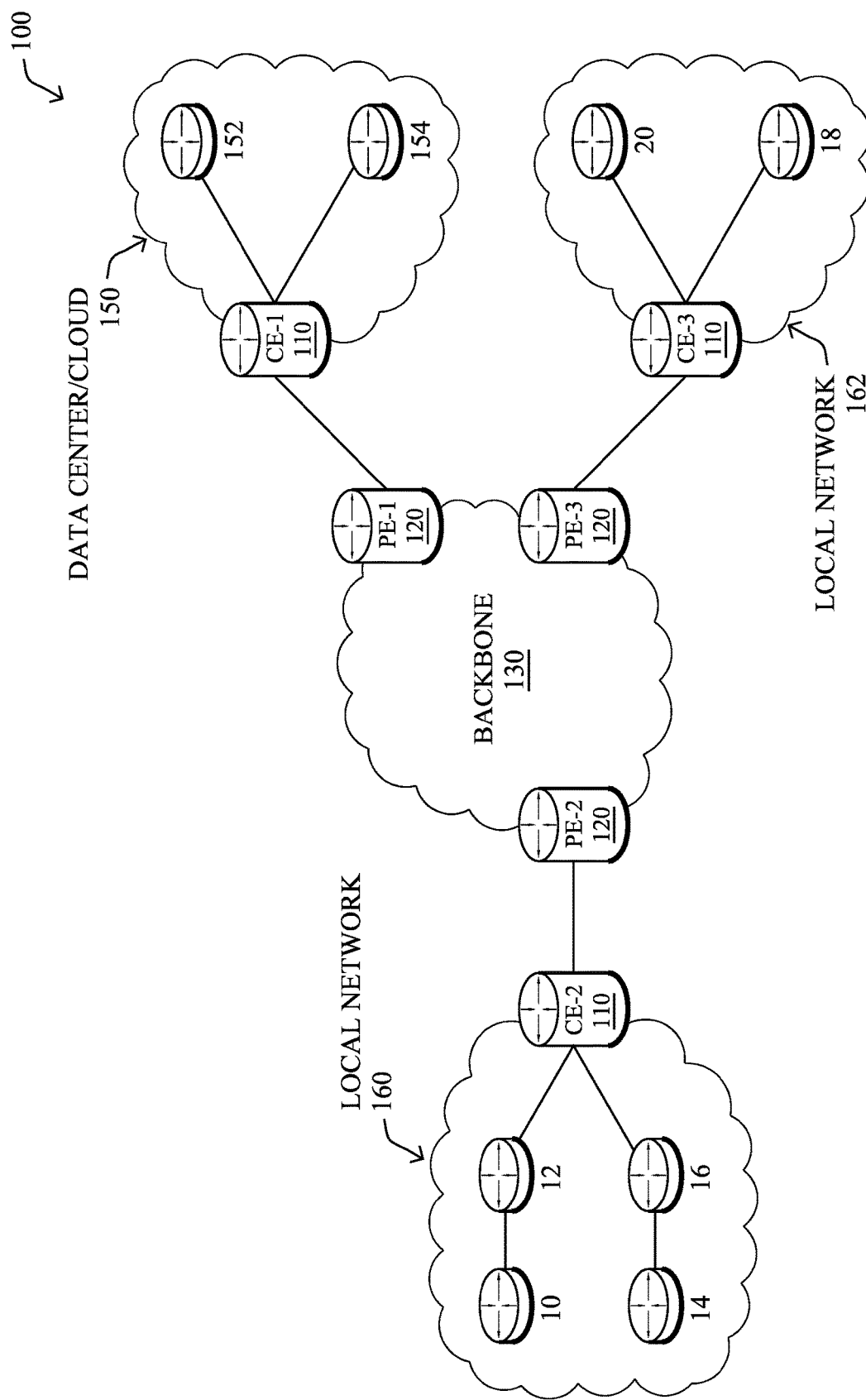

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
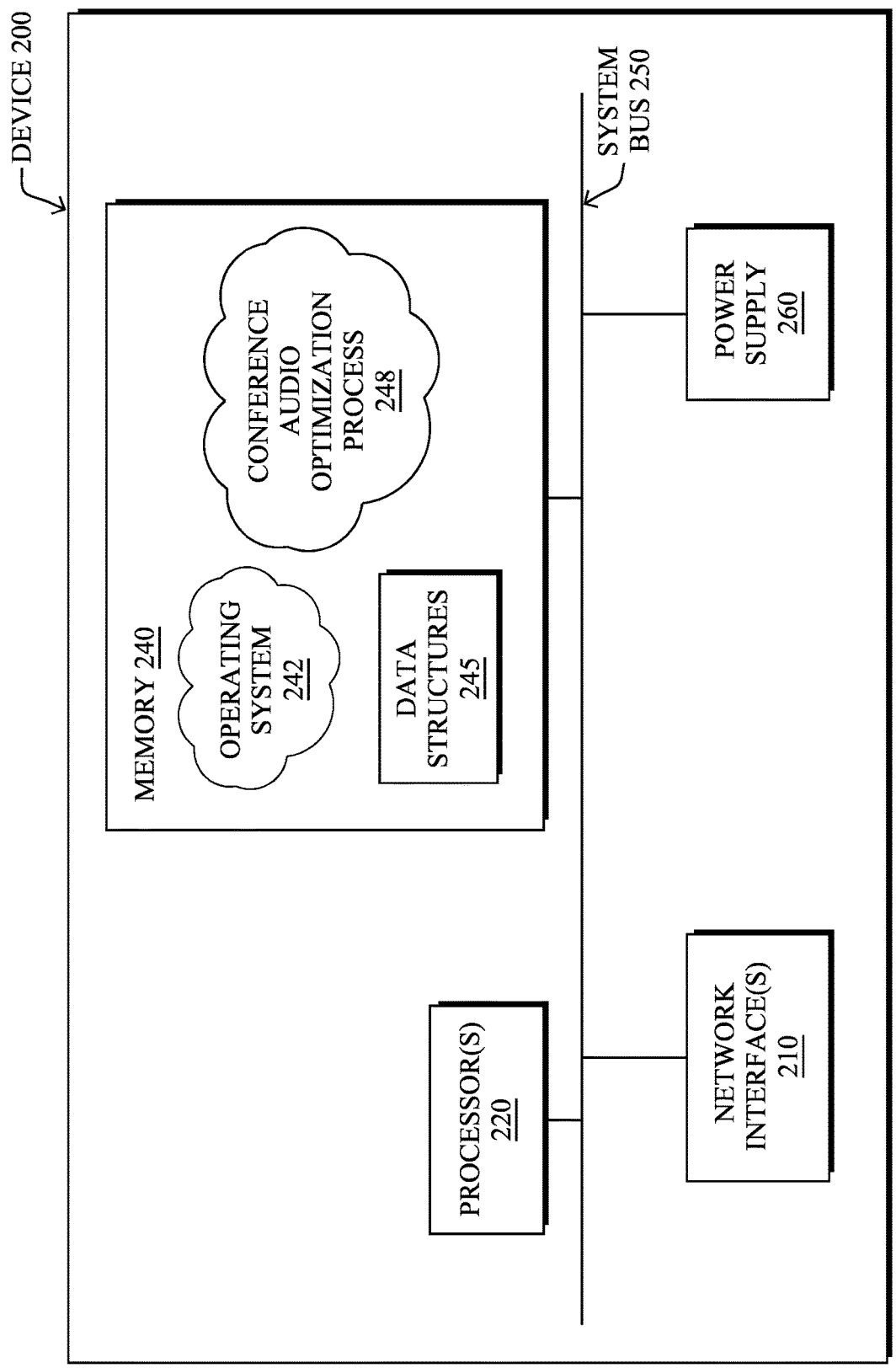
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a conference audio optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Conference audio optimization process 248 includes computer executable instructions that, when executed by processor(s) 220, cause device 200 to provide cognitive reasoning services to a network. In various embodiments, conference audio optimization process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, conference audio optimization process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that conference audio optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, conference audio optimization process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision.

Generally, recall refers to the ratio of true positives to the sum of true positives and false negatives, which quantifies the sensitivity of the model. Similarly, precision refers to the ratio of true positives the sum of true and false positives.

As noted above, people have been connecting remotely with their family, friends, and co-workers over audio and video conferences more now than ever before. The effectiveness of remote conferencing relies heavily on audio quality. As such, audio enhancement and optimization is crucial for creating a remote conference environment that is both enjoyable and productive.

There is no shortage of well-known tools and techniques for audio quality enhancement, including jitter buffers, echo cancelers, predictive codecs, voice activity detection, silence suppression, quality-of-service technologies, queueing variations, network probing, real-time sampling, post-processing, and so on. Each of these methods seeks to manipulate audio data in one form or another to correct and/or improve the quality of audio, especially speech, during a conference. None, however, take into consideration the identities of individual participants of the conference and the pre-existing relationships between them. Understanding the relationships between participants of a meeting, particularly when the participants regularly meet together, can provide important insights into patterns concerning speech distribution, speaking time, behaviors and tendencies, and more.

Proactive Audio Optimization For Conferences

The techniques herein introduce a novel approach to audio optimization by leveraging relationship data between participants of an audio or video conference to discover patterns and other nuances regarding specific audio interactions and tendencies from past collaborations of the participants. This information, in light of other available contextual data, can be utilized to make predictions regarding an upcoming conference based on its participants, such as speech distribution patterns, speaking times, unique voice characteristics, and so on. The predictions then allow for proactive optimization of the conference audio—rather than making retroactive adjustments as is the case with many audio enhancement techniques. In some aspects, historical audio gathered from past conference meetings can be collected and analyzed to create an audio signature and profile for individual participants. In further aspects, techniques described herein allow for proactive selection of dynamic audio filters necessary to optimize the listening experience of the conference based on historical audio behavior of individual meeting attendees. In yet further aspects, knowledge of the participants and associated historical audio can be utilized to predict a primary speaker. Techniques such as multi-band compression filters and thresholds may be proactively applied so as to prioritize audio from the primary speaker and reduce interruptions Illustratively, the techniques described herein may be performed by hardware, software, and/or firmware, such as in accordance with the conference audio optimization process 248, which may include computer executable instructions executed by the processor 220 (or independent processor of interfaces 210), to perform functions relating to the techniques described herein.

Specifically, according to various embodiments, a device obtains audio data from one or more past conferences. A prediction model that predicts when participants of a conference will speak is generated based on the audio data from the one or more past conferences. The device uses the prediction model to predict a speech distribution for participants of a particular conference. Then, the device proactively optimizes audio parameters of the particular conference based on its predicted speech distribution.

Operationally, the techniques relating to conference audio optimization discussed herein may be predicated on the collection of historical audio data, which represents the baseline data needed to generate a prediction model that predicts various aspects of a conference, such as when and how long participants of the conference will speak. The historical audio data may characterize attributes of both past conferences and the attendees of those conferences. These attributes may act as the basis for making predictions relating to an upcoming or ongoing conference, and ultimately utilized by conference audio optimization process 248 to proactively optimize the audio experience of the conference. Moreover, the historical audio data may be mined for voice patterns associated with each participant, as well as building a comprehensive profile of each participants' audio fingerprint, in order to predict the optimal audio settings for those participants.

Briefly, as used herein, "conference" may refer to any meeting, such as an audio conference, a video conference, or the like, in which participants are remotely connected and may communicate with each other using voice. The terms "conference" and "meeting," for example, may be used herein interchangeably.

Figure 3:
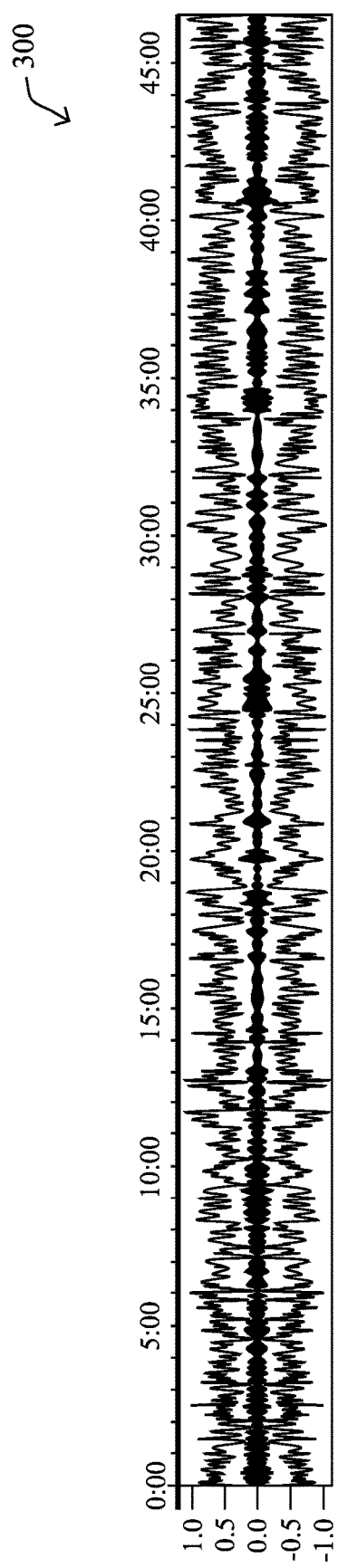
FIG. 3 illustrates an example waveform representation of an audio stream from a past conference.

First, techniques for collecting historical audio data and processing the audio data to generate a prediction model that predicts when participants of a conference will speak will be described. FIG. 3 illustrates an example waveform representation of an audio stream from a past conference, according to various embodiments. The conference audio stream 300 may correspond to an audio stream of a certain length—approximately 45 minutes in this example—from a past conference attended by a group of participants. In typical implementations, conference audio stream 300 is only a sliver of the data necessary for the large-scale modeling and in-depth user analysis discussed herein. Thus, conference audio stream 300 is merely one audio stream of many that should be obtained for the purpose of generating the aforementioned prediction model.

Figure 4:
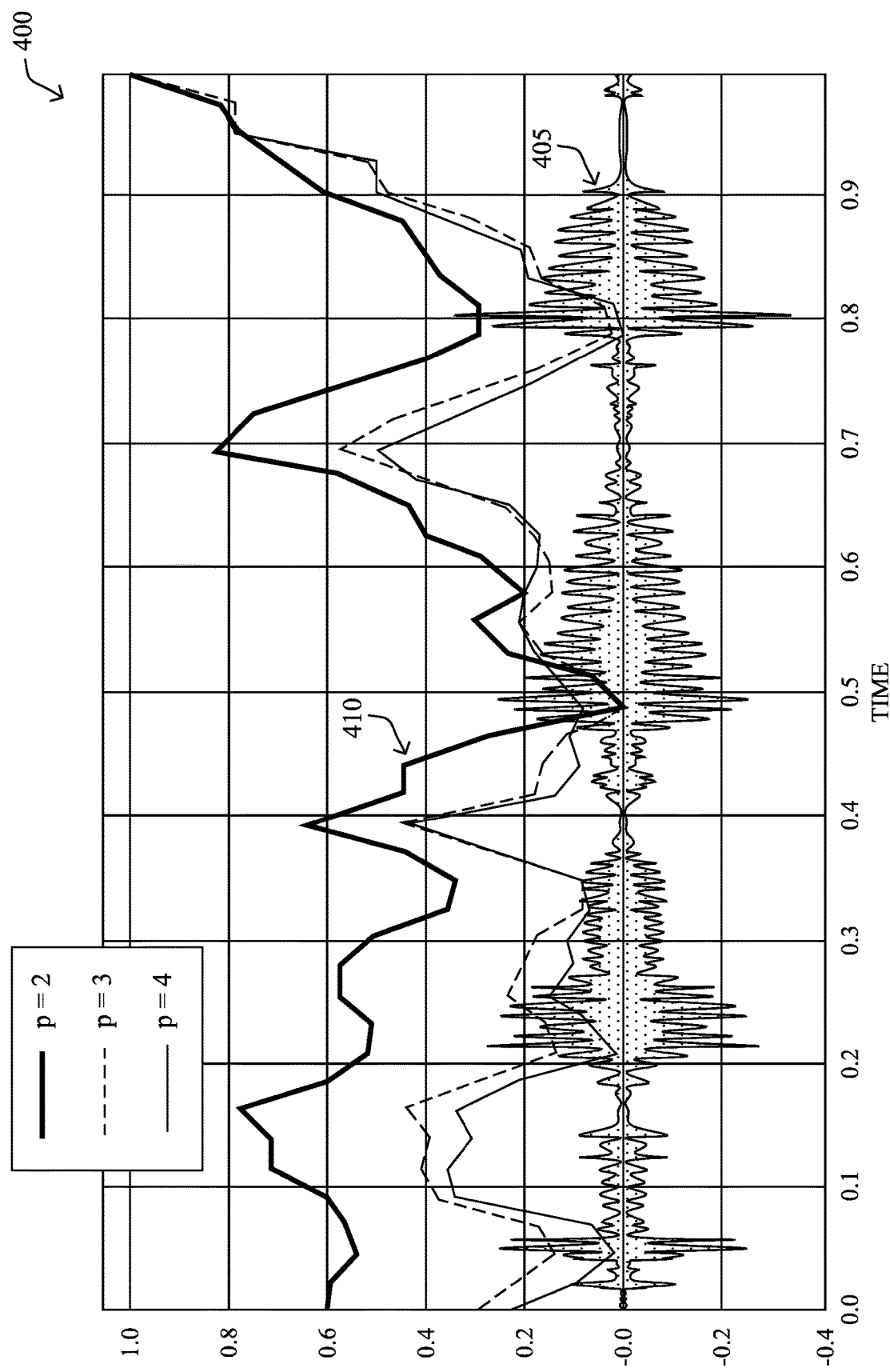
FIG. 4 illustrates an example spectral analysis feature overlay derived from a conference audio stream.

The conference audio stream 300 may then be segmented into single or multi-second chunks for frequency analysis. FIG. 4 illustrates an example spectral analysis feature overlay derived from a conference audio stream, according to various embodiments. As shown, the spectral analysis feature overlay 400 may be segmented into a single second chunk of audio from the conference audio stream 300. Various spectral analysis features 410 (e.g., p=2, p=3, p=4, etc.) may be overlaid on the one-second waveform 405 of spoken words during conference audio stream 300. This process of spectral analysis feature overlaying may be repeated for several audio chunks of the audio stream 300 (e.g., until the entire stream has been analyzed).

Figure 5:
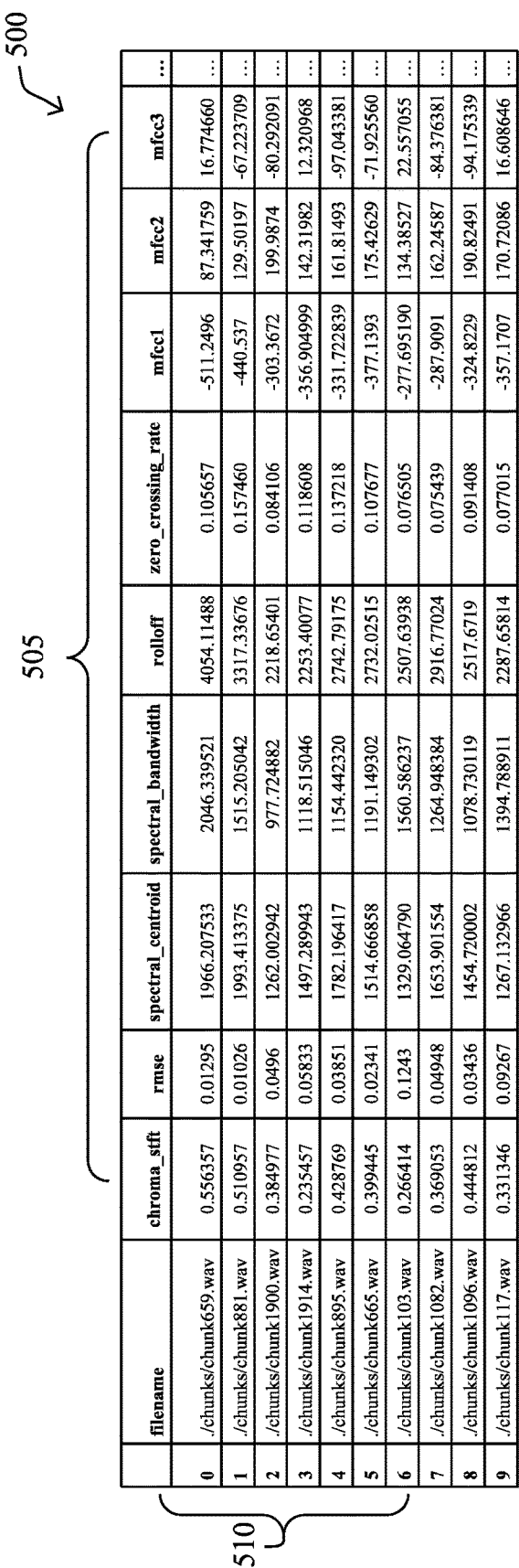
FIG. 5 illustrates an example data frame comprising extracted audio features.

Next, individual components of the spectral analysis feature overlay 400 may be mapped back to the chunks of audio for feature extraction and stored in a data frame. FIG. 5 illustrates an example data frame comprising extracted audio features, according to various embodiments. As shown, data frame 500 contains several audio analysis-related features 505 including, for example, spectral roll-off ("rolloff"), spectral bandwidth ("spectral_bandwidth"), zero cross rating ("zero_cross_rate"), and mel-frequency cepstral coefficients ("mfcc1", "mfcc2", "mfcc3"). Each of the audio analysis-related features 505 may correspond to a specific audio clip 510 (e.g., a one-second audio clip) derived from the conference audio stream 300.

Figure 6A:
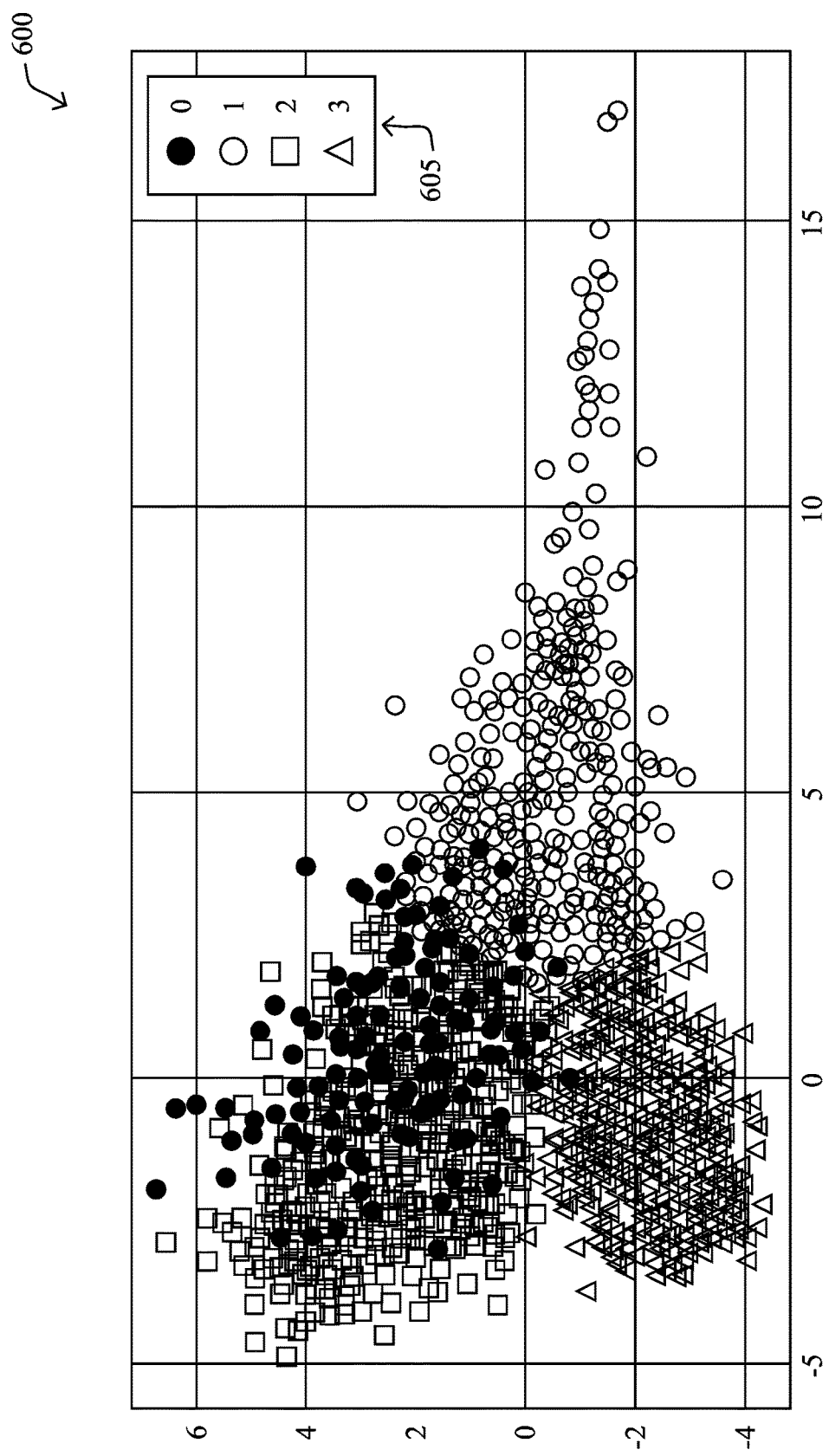

Now that the audio features of conference audio stream 300 have been extracted, as represented in data frame 500, clustering techniques may be applied to standardize and weight the extracted features. FIG. 6A illustrates an example two-dimensional view of voice profile clustering, according to various embodiments. Plot 600 depicts the extracted audio features of conference audio stream 300 once the features have been clustered based on common audio characteristics, e.g., pitch, frequency range, tone, speed of delivery, etc. For instance, each point on the plot 600 may represent the normalization of extracted audio features for a given one-second interval of conference audio stream 300. Moreover, each point may be clustered, that is, identified as part of a particular cluster 605 (e.g., '0', '1', '2', '3'), each of which may correspond to a particular participant of the conference being assessed. In other words, cluster '0' may correspond to "participant_0," cluster '1' may correspond to "participant_1," cluster '2' may correspond to "participant_2," and cluster '3' may correspond to "participant_3." In some embodiments, the clustering of extracted audio features may be carried out using machine learning-based clustering techniques (e.g., k-means, mean-shift, etc.).

Upon clustering it becomes apparent that the extracted audio data identifies distinct differences in the characteristics of each participant's voices. It is understood that such characteristics as pitch, frequency range, tone, and speed of delivery all contribute to making a voice unique. Thus, each cluster 605 may represent a collection of extracted audio features corresponding to a particular participant during a past conference. The cluster of audio features corresponding to a particular participant may later be utilized for further processing, such as determining the speech distribution of participants in a conference, determining a primary speaker of the conference, formulating collaboration groups, and so on, as described in further detail below.

In some embodiments, it may also be the case that two of the speakers (e.g., cluster '0' and cluster '2' in this example) share some of the same characteristics of audio features and thus overlap each other, potentially causing confusion in identifying which audio features may be attributed to specific participants. This may be resolved by collecting additional audio data from historical streams, as well as the tagging of audio associated with a participant, so that a clear characteristic fingerprint eventually takes shape for the participant.

Alternatively, or additionally, a third dimension may be added to the two-dimensional view of plot 600. In this regard, FIG. 6B illustrates an example three-dimensional view of voice profile clustering, according to various embodiments. By leveraging a third dimension in the view of plot 600, it becomes more apparent in this example that there are data points 610 associated with cluster '0' ("participant_0") being hidden behind cluster '2' ("participant_2"). Thus, the three-dimensional view of FIG. 6B, in comparison with the two-dimensional view of FIG. 6A, may provide additional awareness of the clustered audio features that are overlapped by audio features of another cluster.

It should be appreciated that as historical meeting audio streams are collected for a given participant and clustered in the manner specified above, a well-defined audio profile of the participant may be established, the audio profile comprising the participant's common and average tonality, pitch, frequency range, perceived volume characteristics, etc. This audio profile, referred to herein as an audio "fingerprint," may be unique to the participant due to the uniqueness of each participant's voice characteristics. The audio fingerprint, as described in greater detail below, may be utilized as a factor for optimizing the audio experience of a particular conference. For example, the conference audio may be dynamically balanced at a time when a particular participant is predicted to speak according to that particular participant's audio fingerprint.

Now that the audio features from conference audio stream 300 have been extracted, with audio analysis-related features 505 mapped to specific segments of the stream 300 using spectral analysis, and the features being clustered to form audio feature clusters associated with each conference participant, the resultant audio data may be obtained and organized for further processing in order to generate a prediction model that predicts when the participants of a conference will speak. FIG. 7 illustrates an example table of audio data 700 from one or more past conferences, according to various embodiments. Audio data 700 may be collected from one or more past conferences and comprise a characterization of various attributes of those conferences. In particular, audio data 700 may be indicative of speech-related events for each individual participant during the conferences; though it should be understood that the specific audio data collected is not limited solely to the attributes shown in FIG. 7.

As illustrated, the audio data 700 may include a conference identifier 710 ("meeting_id") for each of the past conferences from which audio data is collected. The past conferences may be identified further by a conference title 715 ("title") and a conference duration 725 ("meeting_time"). In this example, audio data 700 is collected from three past conferences: conference '12345' titled "weekly scrum"; conference '12355' titled "devops team meeting"; and conference '12459' titled "monthly sync." Audio data 700 may also indicate the length 325 ("meeting_time") of each conference. In this example, every conference was 60 minutes in length.

The audio data 700 may include not only of the aforementioned attributes of past conferences, but also attributes related to the participants, i.e., attendees, of each conference. The participants may be designated by a participant identifier 705 ("username"), such as a first and/or last name of the participant, a nickname of the participants, and so forth. In this example, there are eight participants across the three past conferences: Derek; Alice; Gonzalo; Ivan; Chuck; Heidi; Eve; and Bob. Audio data 700 may further indicate the amount of time that each participant spoke 720 ("talk_time") in each conference. For example, during the "weekly scrum" conference, Derek, Alice, Gonzalo, and Ivan spoke for 7.7 minutes, 39.8 minutes, 8.2 minutes, and 4.1 minutes, respectively.

Additionally, in some embodiments, the audio data 700 may include a collaboration matrix 730 (or the collaboration matrix 730 may be generated based on the audio data 700) that indicates which participants participated together, i.e., collaborated, across the different conferences. The collaboration matrix 730, for instance, may be a two-dimensional [m×n] matrix, whereby m represents the number of unique participants across all conferences, and n represents the number of participants in each of the conferences, respectively. In this example, the number of unique participants across all conferences (rn) is eight, and the number of participants in each of the conferences, respectively (n), is ten (i.e., the sum of: the number participants in conference #1, the number of participants in conference #2, and the number of participants in conference #3). In some embodiments, each element of the collaboration matrix 730 may include a binary indicator (e.g., '0' or '1') indicating whether or not a particular participant collaborated with another particular participant in a corresponding conference. For example, collaboration matrix 730 reveals that Ivan collaborated with Alice, Derek, and Gonzalo in the "weekly scrum" conference, but did not collaborate with Bob, Chuck, Eve, and Heidi in the same.

The insights revealed by audio data 700, in addition to the collaboration matrix 730, both of which derive from past conferences, may be leveraged by the conference audio optimization process 248 to generate a prediction model that may predict various aspects of an upcoming conference including, for instance, a speech distribution of the conference that indicates when participants of a conference will speak, which participants will collaborate in the conference together, which participant will be the primary speaker, and so on. In some embodiments, the prediction model may be a machine learning-based prediction model that utilizes machine learning techniques, in whole or in part, to perform its analysis and reasoning functions. The machine learning-based prediction model may comprise one or more supervised, unsupervised, or self-supervised machine learning models, consistent with the description provided above. Upon generating the prediction model, it may be employed to predict a speech distribution for participants of a particular conference, and thereafter, audio parameters of the particular conference may be proactively optimized in view of the predicted speech distribution.

A prediction model, as would be appreciated, relies upon proper training to output accurate predictions. In this case, the prediction model may be trained using the audio data 700, and more specifically, by determining collaboration groups based on a participation of participants in one or more past conferences. To this end, the historical collaborative relationships between the participants (reflected in collaboration matrix 730, for example) may be utilized to aggregate the participants into collaboration groups that identify frequent collaborators who often participate in meetings together.

Figure 8A:
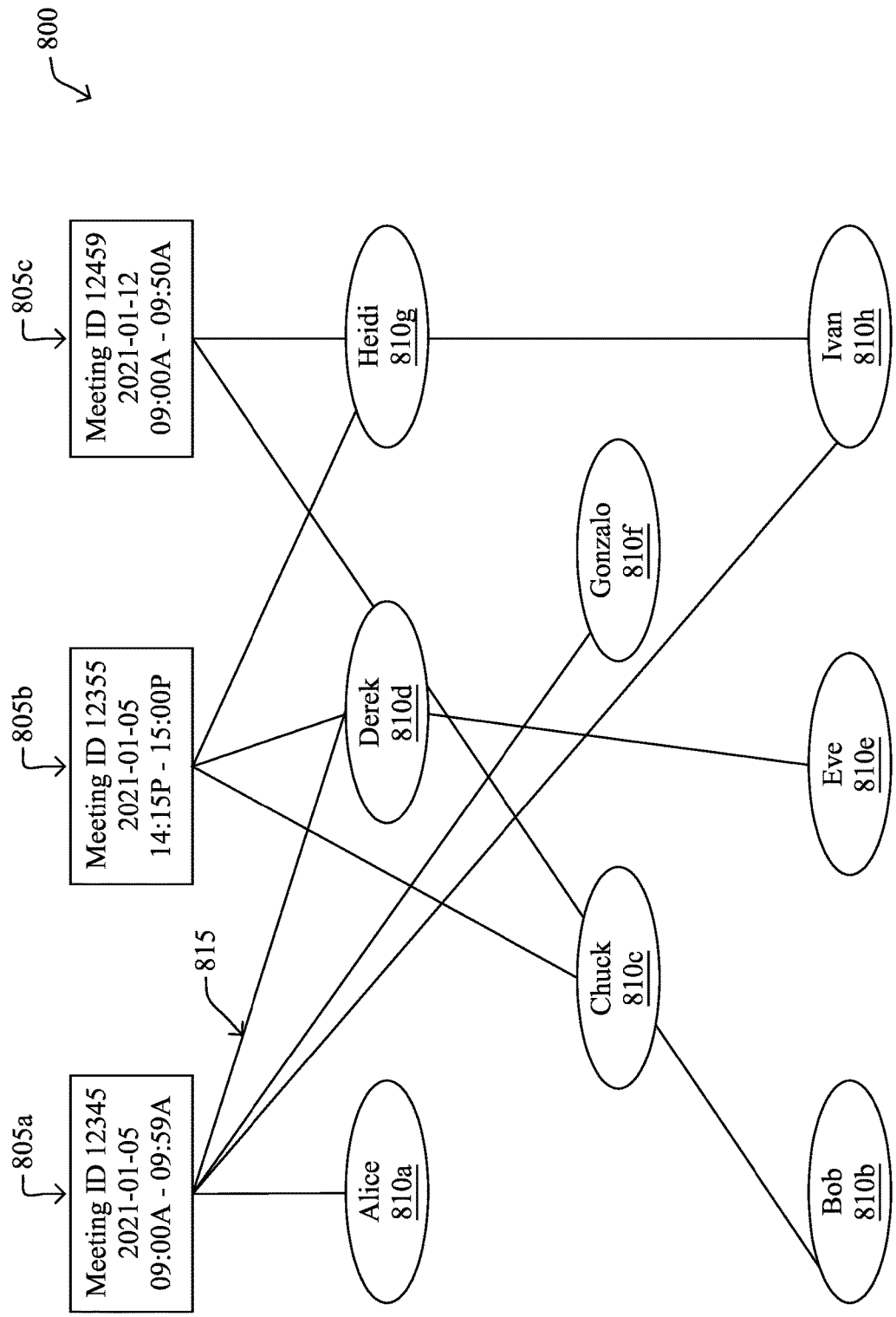
FIG. 8A illustrates an example participant-conference relationship mapping based on historical audio data.

To demonstrate, FIG. 8A illustrates an example participant-conference relationship mapping 800 based on the audio data 700, according to various embodiments. As shown, the participant-conference relationship mapping 800 may be represented by a graph, for instance, but is not solely limited thereto. In some embodiments, the participant-conference relationship mapping 800 may comprise a plurality of nodes representing conferences 805a-805c and participant nodes representing participants 810a-810h. The conference nodes and participant nodes may be interconnected by relationship links 815 indicating that a particular participant participated in a corresponding conference. For example, Ivan (810h) is interconnected with Meeting ID 12345 (805a) and Meeting ID 12459 (805c) consistent with the collected audio data 700.

Because certain conferences are conducted on a regular basis, particularly those associated with workplace collaboration, there tends to be a high degree of correlation of attendance between certain smaller pools of participants. Groups of participants that tend to appear in meetings together may be segmented into collaboration groups or cliques through further analysis, such as community or clique analysis, market basket analysis (MBA), and so on, of the participant-conference relationship mapping 800 in order to identify strong connections between groups of individuals. Participants in the same collaboration group, therefore, may be labeled as frequent collaborators. Important insights related to the audio characteristics of a conference attended by frequent collaborators can be gleaned, as described in greater detail below.

Figure 8B:
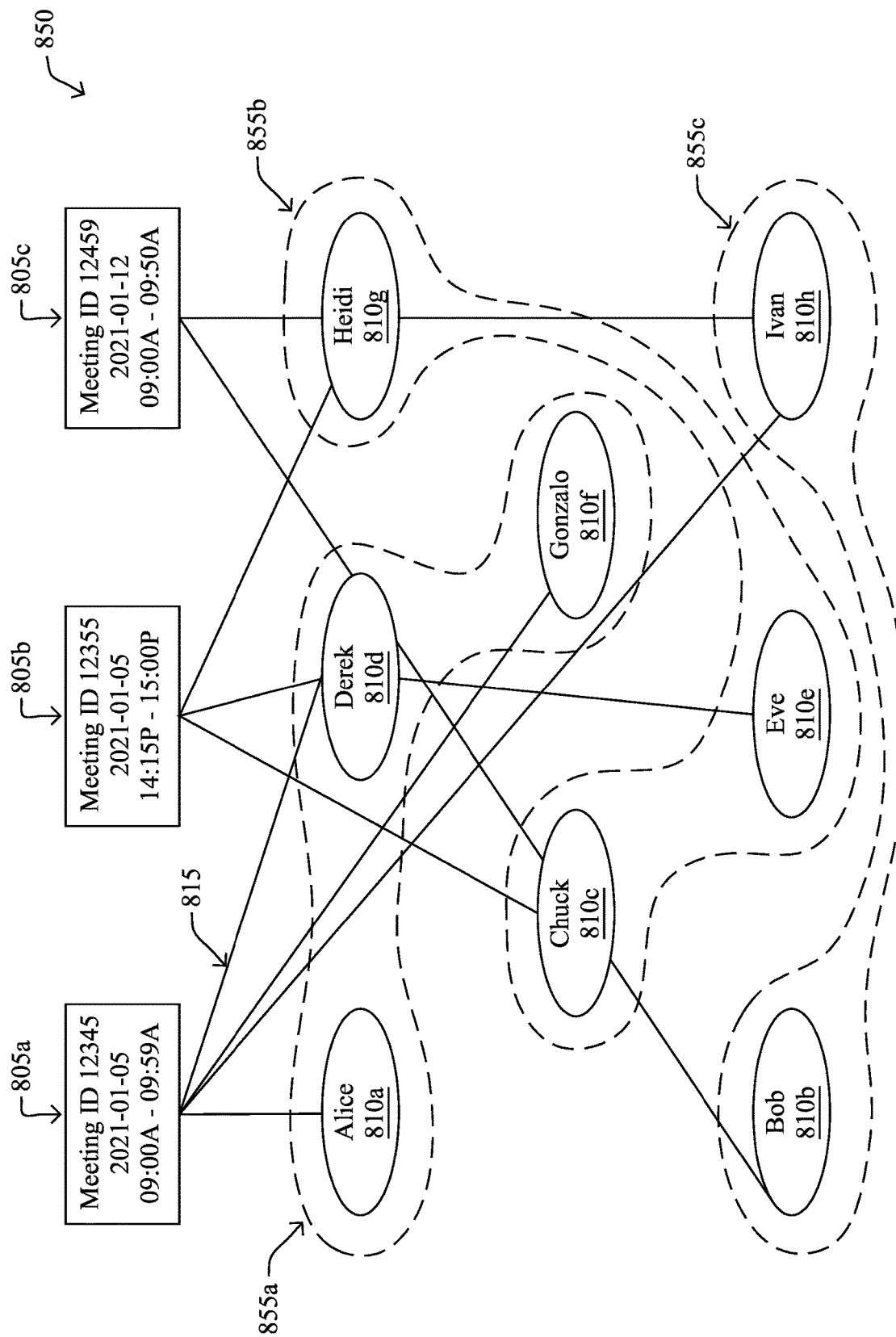
FIG. 8B illustrates an example frequent collaborator grouping based on the participant-conference relationship mapping of FIG. 8A.

FIG. 8B illustrates an example frequent collaborator grouping 850 based on the participant-conference relationship mapping 800, according to various embodiments. As shown, participants 810a-810h may be aggregated based on each participant's association with the other participants based on the conferences they have attended in common. These associations, as explained above, may be established in audio data 700 and mapped by the participant-conference relationship mapping 800. Using this information, the participants may be grouped into subsets, i.e., collaboration groups 855a-855c, based on their attendance correlation, or in other words, the likelihood of the participants joining the same conference. In some cases, the confidence level of the relationships between the various participants can be calculated (e.g., using graph theory techniques well-known in the art) and used to determine whether participants should be included together in a collaboration group. For instance, a subset of participants may be assigned to a collaboration group when a confidence level associated with their interrelationships exceeds a predefined threshold.

In this example, frequent collaborator grouping 850 shows a first collaboration group 855a of [Alice; Derek; Gonzalo], a second collaboration group 855b of [Chuck; Eve; Heidi], and a third collaboration group 855c of [Bob; Ivan]. As shown, the shading of the first collaboration group 855a [Alice; Derek; Gonzalo] is dark, indicating a high level of confidence in their interrelationships, whereas the shading of the second collaboration group 855b [Chuck; Eve; Heidi] is light, indicating a lower level of confidence in their interrelationships. According to some embodiments, these collaboration groups, optionally in conjunction with their confidence levels, may be part of the information used to generate the aforementioned prediction model for predicting a speech distribution of a particular conference.

In addition to determining the frequency of collaborators, it is possible to gain insight into the structure of a conference by analyzing the behavior of individuals in a collaboration group and identifying patterns of speech distribution. A speech distribution, generally speaking, may provide a mapping of when and how often during a particular conference each individual participant spoke. Particularly, the speech distribution maps spoken elements to participants in a given conference. The speech distribution may be generated based on the extraction of voice features or transcript data from historical audio data (e.g. audio data 700) of one or more past conferences.

After employing the aforementioned techniques to extract the voice features of conference participants, the extracted features can be used to generate one or more speech distributions that map when and how often during a particular conference each individual participant spoke. The speech distribution of a given conference may be indicative of a speaking schedule indicating when each of the participants of a particular conference is predicted to speak. Notably, the speech distribution of past conferences can be used for training the prediction model to predict a speech distribution for participants of an upcoming conference.

Figure 9A:
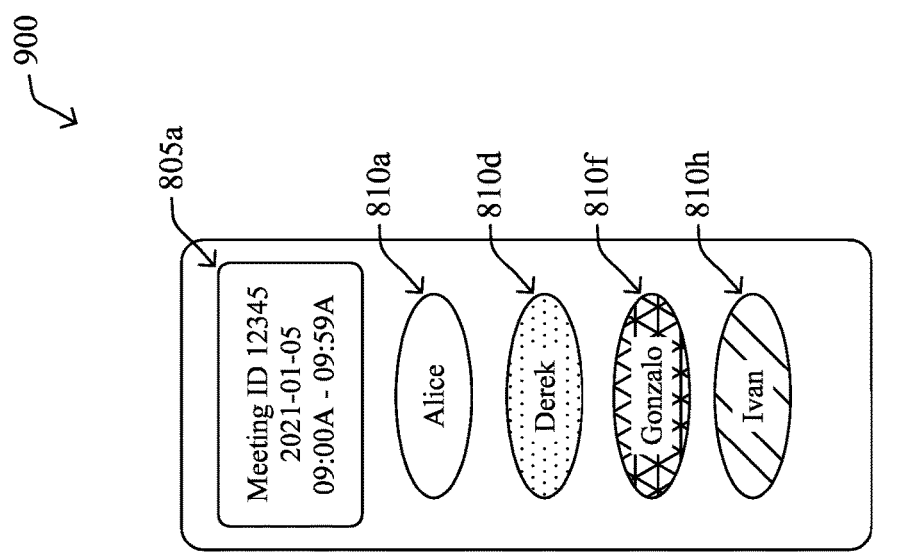
FIGS. 9A and 9B illustrate example speech distributions of a past conference.
Figure 9A:
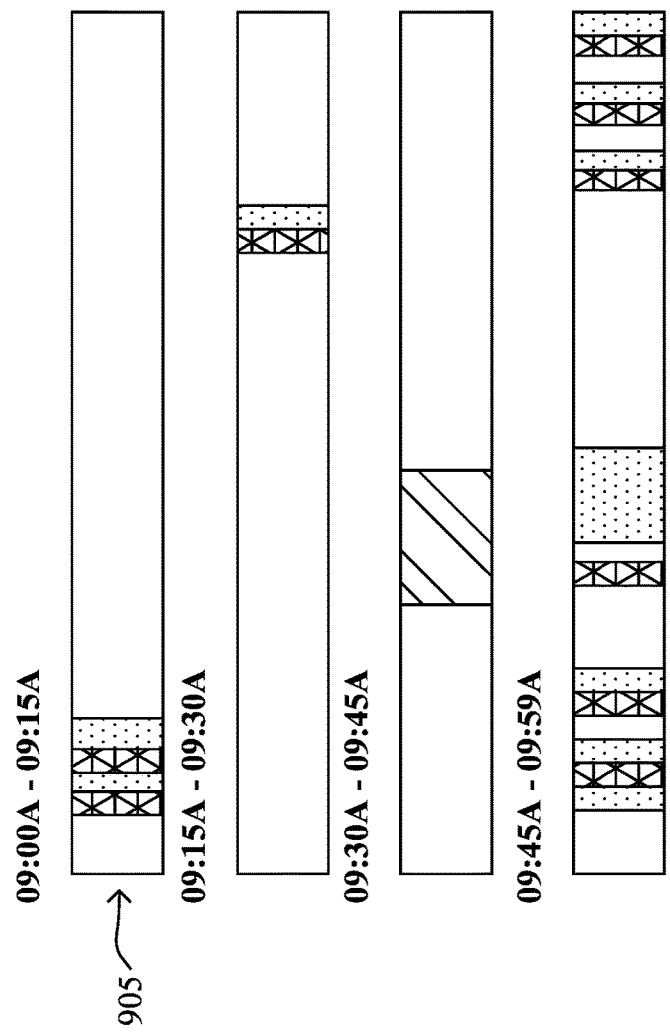

FIG. 9A illustrates an example speech distribution 900 of a past conference, according to various embodiments. In this example, speech distribution 900 depicts the speaking times and durations of participants in a conference 805a, which lasted from 9:00 AM to 9:59 AM and was attended by Alice (810a), Derek (810d), Gonzalo (8100, and Ivan (810h), as reflected in audio data 700. It is evident, based on the mapping, that Alice dominated the speaking throughout the entirety of the conference 805a. As such, it may be deduced that Alice is the primary speaker for not only the particular conference 805a depicted in speech distribution 900, but future occurrences of conference 805a, as well. This conclusion may be corroborated by analyzing the speech distribution of other occurrences of conferences 805a and determining the degree of similarity between the speech distributions of each conference occurrence. In some embodiments, the speech distribution may be divided into time segments 905, and a primary speaker may be identified for each individual time segment. In such case, Alice would be identified as the primary speaker for each of the time segments 905. As described further below, identification of a primary speaker can be a key factor in optimizing the audio experience of a conference.

Additionally, a speech distribution of a given conference can be analyzed for identifiable patterns. In this case, speech distribution 900 depicts the presence of an evident pattern—namely, a meeting that begins with pleasantries, with a primary speaker (Alice), followed by general discussion or questions and answers at the conclusion of the meeting. Speech distribution 900, in fact, is a candidate example for optimizing the audio relationships between participants of a collaboration group by emphasizing or prioritizing audio from the primary speaker, who historically expresses a high confidence of speaking the majority of the meeting when working with repeat colleagues. An example of some of the audio optimization techniques that may be proactively applied in light of a predicted primary speaker are discussed in detail below.

Figure 9B:
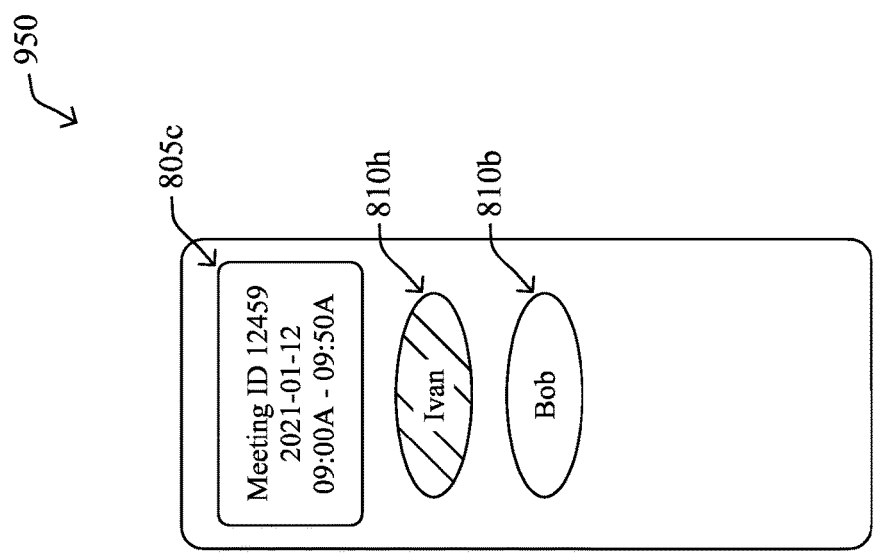
Figure 9B:
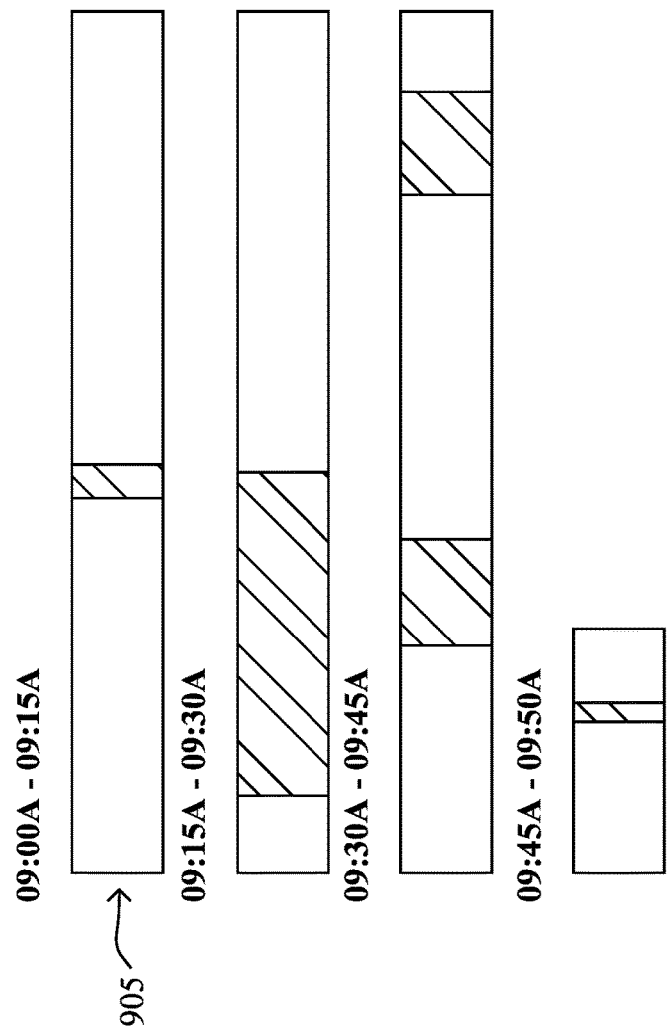

FIG. 9B illustrates another example speech distribution 950 of a past conference, according to various embodiments. In this example, speech distribution 950 depicts the speaking times and durations of participants in conference 805c, which lasted from 9:00 AM to 9:50 AM and was attended by Ivan (810h) and Bob (810b), as reflected in audio data 700. It is evident, based on the mapping, that Bob dominated the speaking throughout the entirety of conference 805c. Similar to the analysis of FIG. 9A, it may be deduced that Bob is the primary speaker for not only the particular conference 805c depicted in speech distribution 950, but future occurrences of conference 805c, as well. This conclusion may be corroborated by analyzing the speech distribution of other occurrences of conferences 805c and determining the degree of similarity between the speech distributions of each conference occurrence. According to some embodiments, the detected speech distribution patterns from past conferences may be part of the information used to generate the prediction model. Additional data insights may be gleaned from the speech distributions, such as the primary speaker identified in one or more past conferences, a total speaking time of each participant in the past conferences, and so on. These insights, too, may be used to generate the prediction model.

In some embodiments, metadata associated with the past conferences can be obtained to detect additional information regarding those conferences, such as the date of a conference, the time of a conference, keywords associated with a conference, the attendance of a conference, the scheduling regularity or frequency of a conference (in the case of a recurring conference, for example), and so on. Continuing with the present example, assume a meeting (e.g., conference 805a) contains the keywords "weekly" and "scrum" (e.g., words included in the title), and for the last 12 weeks, every Monday from 9:00 AM to 10:00 AM, the meeting was attended by a consistent group of participants: Derek, Alice, Gonzalo, and Ivan. This historical context may also be provided as training data to the prediction model. Thus, based on the above, the trained prediction model may predict that the group of participants form a collaboration group which meets for weekly status or update sharing. Moreover, given the regularity of the conference and its consistent attendance, it may be assumed that the confidence level calculated for this particular collaboration group (e.g., using graph theory techniques well-known in the art) is high. Therefore, the prediction model may predict with a relatively high level of confidence that if Derek, Alice, and Gonzalo are attending a conference occurring on a Monday morning, Ivan is likely to join the meeting, as well.

Further processing of the conference audio data 700 may reveal even more insights. Indeed, a variety of characteristics regarding a particular past conference may be assessed, such as the scheduling regularity of the conference, participants or collaboration groups associated with the conference, a speaking schedule of the participants during the conference (e.g., when the participants speak and for how long), keywords associated with the conference, a date or time of the conference, etc. Assume, for instance, the following conclusions drawn regarding a particular past conference:

Derek and Gonzalo have meetings on Monday mornings and have had these meetings for 26 consecutive weeks.

When Derek and Gonzalo have a meeting on Monday morning at 9:00 AM, 95% of those meetings include Alice.

When Alice has a meeting on Mondays at 9:00 AM, she speaks for an average of 41 minutes.

When Derek and Gonzalo have a meeting with Alice, 85% of the time Derek and Gonzalo have a higher ratio of speaking within the last 15 minutes of the meeting than anywhere else in the meeting.

This collection of confidence-driven attributes, along with any other of the above insights with respect to the historical audio data 700 (e.g., historical speech distributions, collaboration groups, primary speakers, participant speaking times, etc.) may be used to generate and train the prediction model to predict a speech distribution for participants of an upcoming conference, which may then be used as the basis for proactively optimizing the audio of the upcoming conference.

In general, the prediction model can predict the upcoming speech distribution using one or more characteristics of the upcoming conference as input. A variety of characteristics of the upcoming conference may be used as input to the prediction model, such as, for instance, a date of the conference, a time of the conference, keywords (e.g., title) associated with the conference, a scheduling regularity of the conference, a past attendance of the conference, and so forth. Using any of these inputted characteristics, the trained prediction model may generate a predicted speech distribution that characterizes when and how long participants of the conference will speak.

For example, with reference to the attributes listed above, assume a conference is to take place at 9:00 AM on an upcoming Monday, and keywords associated with the conference match those of the same conference that has taken place for 26 consecutive weeks. The trained prediction model may predict a speech distribution for participants of the upcoming conference, whereby the predicted speech distribution indicates that Alice is to make a presentation to Derek and Gonzalo. Furthermore, assume the predicted speech distribution indicates that Alice is expected to be the primary speaker until the 45-minute mark, at which point a question-and-answer segment will begin.

Based on these predictions, the audio parameters of the conference may be intelligently controlled so as to proactively optimize the audio experience. In this example, from an optimization standpoint, greater audio bandwidth or a higher bitrate of data may be dynamically allocated for Alice since she is expected to be the primary speaker until the 45-minute mark. Conversely, Derek and Gonzalo's gain may be reduced to lower the noise floor of the room soundscape during Alice's presentation. During the question-and-answer portion of their conversation, dynamic balancing may be performed based on the historical audio fingerprints of each participant. The historical audio fingerprints, as described above with reference to FIGS. 6A and 6B, characterize the voice characteristics unique to each participant. Moreover, it may be determined whether there is any spectrum overlap based on the participants' audio fingerprints (e.g., hidden data points 610). In response, the audio may be balanced accordingly so as to create more clarity and space in the conversation.

Notwithstanding the above example, the speech distribution of the conference, as predicted by the prediction model, may be employed to proactively optimize the audio parameters of the conference in several ways. In some embodiments, when a collection of audio fingerprints corresponding to participants of a conference has been defined according to the techniques discussed above, the fingerprints can be taken into account whenever participant is paired with one or multiple other users with established audio fingerprints. Specifically, the audio fingerprint information may be used to proactively identify audio compatibility between multiple sources and automatically configure (or recommend) a baseline equalization and dynamics profile that balances the audio of collaborating participants. This may be especially powerful for established collaboration groups because a previously applied suite of audio settings can be further optimized and proactively set as a starting point for all meetings between those participants with an already well-known audio chemistry.

In some embodiments, audio parameters of the conference may be controlled so as to draw a contrast between similar sounding speakers. For instance, if the respective audio fingerprints of participants have audio characteristics that mask each other (e.g., see FIG. 6B), indicating that two or more participants have similar sounding voices, the stereo width of audio playback may be adjusted to draw contrast between those voices. Slight panning to the left and right of the speakers gives the impression that the overlapping frequencies are no longer a mono source, but rather two distinct voices that have space separating them in the stereo field.

In further embodiments, the audio parameters may be controlled so as to avoid or reduce the impact of interruptions. For instance, the predicted speech distribution may indicate a primary speaker of a particular conference according to the techniques discussed above. Knowledge of the audio fingerprints of both the primary speaker and other attendees of the conference can be leveraged to prioritize audio from the primary speaker. Specifically, because the audio fingerprints may indicate the frequency range of each participant, an inverse filter based on the frequency ranges may be employed at a time when the primary speaker is predicted to speak (or dynamically employed in real-time), whereby the inverse filter is operable to eliminate or at least reduce noise from any participant other than the primary speaker. The cluster plot 600, as illustrated in FIGS. 6A and 6B, could be used to identify the frequency components of any overlapping sound clips to determine which frequency ranges to compress if an attendee interrupts the primary speaker, quickly bringing down the volume of the interrupter based on the overlapping frequency characteristics. In this manner, an audio filter (e.g., inverse filter) may be selected and applied during the conference based on the predicted speech distribution, and more particularly, the predicted primary speaker and/or the speaking schedule.

In yet further embodiments, the average volume of the conference "room" can be optimally adjusted automatically. The perceived volume dynamics may be affected and accounted for by normalizing historical audio fingerprints corresponding to the meeting participants. If the comparison of audio fingerprints differs greatly between two participants, for example, automated gain control can be applied to create a uniform signal level for all attendees. Furthermore, for participants that have a history of positioning their microphone or other input device too close to the audio source, gain levels may automatically reduce to the room average. Inversely, for participants that tend to position the microphone or input device further away, or participants with a low power delivery, the gain levels may automatically increase to the room average, thereby controlling the conference's average volume in an optimal manner.

Figure 10:
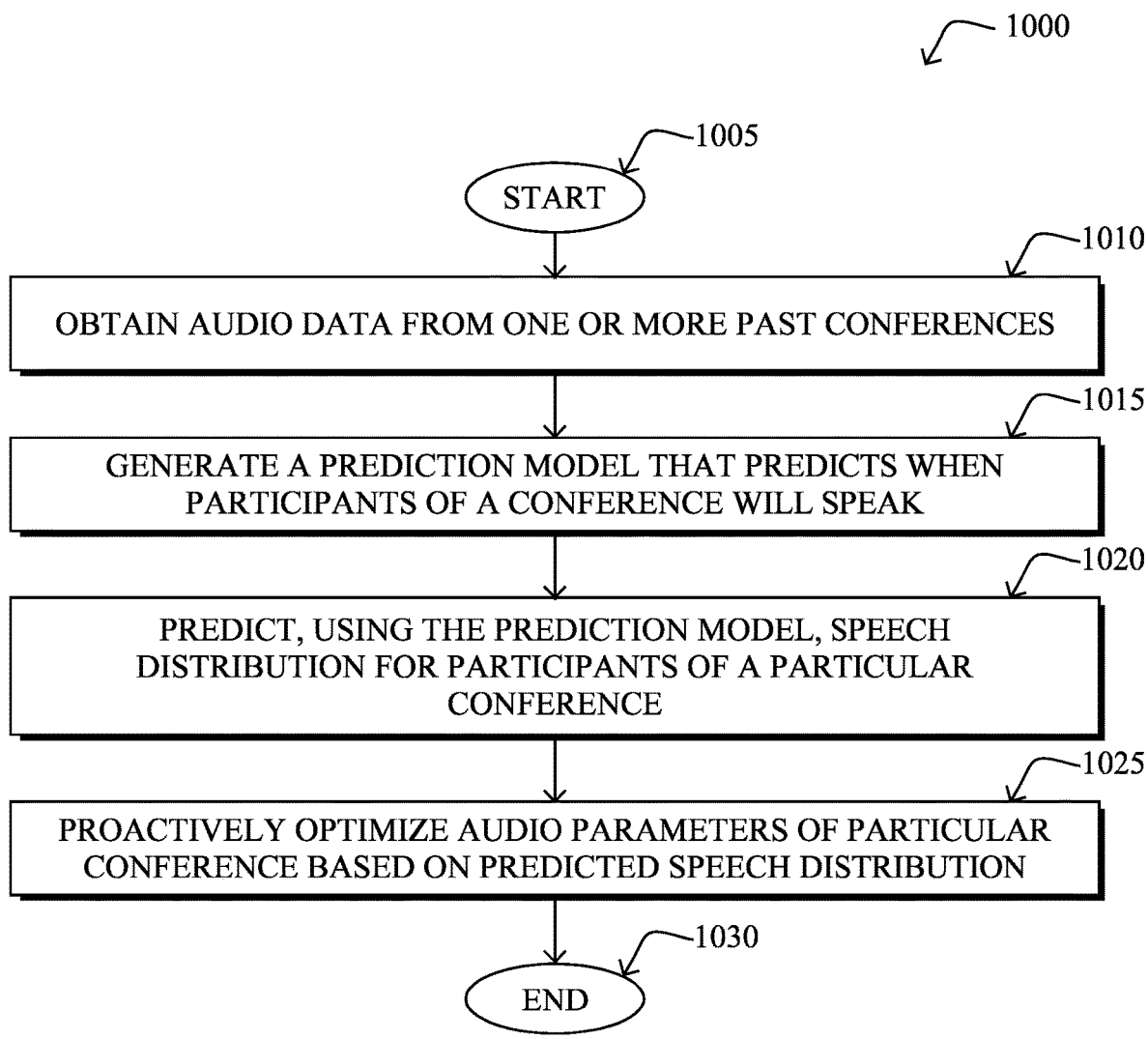
FIG. 10 illustrates an example simplified procedure for proactive audio optimization of conferences.

FIG. 10 illustrates an example simplified procedure for proactive audio optimization of conferences, in accordance with one or more embodiments described herein. For example, a non-generic, specifically configured device (e.g., device 200) may perform procedure 1000 by executing stored instructions (e.g., conference audio optimization process 248). The procedure 1000 may start at step 1005, and continue to step 1010, where, as described in greater detail above, the device may obtain audio data from one or more past conferences. As discussed above, audio features from one or more conference audio streams 300 may be extracted, and audio analysis-related features 505 may be mapped to specific segments of the streams 300 using spectral analysis. Further, the features may be clustered to develop audio feature clusters associated with each conference participant, thus forming the basis for audio fingerprints corresponding to each participant. The extracted audio features from one or more past conferences may be collected, e.g., audio data 700, and comprise a characterization of various attributes of those conferences.

At step 1015, as detailed above, the audio data from one or more past conferences may be used to generate a prediction model. The prediction model may predict various aspects of the particular conference including, for instance, a speech distribution of the conference that indicates when participants of a conference will speak, which participants will collaborate in the conference together, which participant will be the primary speaker, and so on. In some embodiments, the prediction model may be a machine learning-based prediction model that utilizes machine learning techniques, in whole or in part, to perform its analysis and reasoning functions. The prediction model may be generated (i.e., trained) using training data consisting of insights with respect to the historical audio data 700, such as speech distribution patterns, collaboration groups, primary speakers, participant speaking times, collaboration groups, and the like.

At step 1020, as detailed above, a speech distribution for participants of a particular conference may be predicted using the generate prediction model. The speech distribution may provide a mapping of when and how often during the particular conference each individual participant will speak. As such, the speech distribution may predict additional insights regarding the particular conference including a speaking schedule (i.e., when and how long each participant will speak), identification of a primary speaker, and so forth. In some embodiments, the prediction model can predict the upcoming speech distribution using one or more characteristics of the upcoming conference as input. A variety of characteristics of the upcoming conference may be used as input to the prediction model, such as, for instance, a date of the conference, a time of the conference, keywords (e.g., title) associated with the conference, a scheduling regularity of the conference, a past attendance of the conference, and so forth. Using any of these inputted characteristics, the trained prediction model may generate a predicted speech distribution that characterizes when and how long participants of the conference will speak At step 1025, as detailed above, audio parameters of the particular conference may be proactively optimized based on the speech distribution predicted in step 1020. For instance, the predicted speech distribution may indicate a primary speaker for the particular conference. In such case, the audio parameters of the particular conference may be controlled to prioritize audio output by the primary speaker during the conference. Similarly, the predicted speech distribution may indicate a speaking schedule for the particular conference. In such case, the audio parameters of the particular conference may be controlled to according to the speaking schedule. If the speaking schedule predicts an interruption at a certain time, for example, an inverse filter may be applied to reduce the volume of the interrupter to accentuate the primary speaker's voice. Furthermore, the audio parameters may be controlled based on audio fingerprints generated based on historical audio data for each of the participants, as explained above. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the is embodiments herein.

The techniques herein, therefore, allow for optimizing the audio of a conference proactively by leveraging relationship data between participants of the conference to predict speech distributions and other nuances based on specific audio interactions and tendencies from past collaborations of the participants. By analyzing the audio features that make each meeting participant's speech pattern unique, it is possible to deliver a fully automated and predictive curated meeting audio experience, tailored specifically to the specific audio interactions of frequent collaborators, the predicted speech distribution, and the fingerprinted auditory nuances of each individual participant.

While there have been shown and described illustrative embodiments that provide for a reasoning engine-based real-time adaptation of holographic imaging to a physical environment, it is to be understood that various other adaptations and modifications may be made within the spirit and scope of the embodiments herein. For example, while certain embodiments are described herein with respect to holographic images, particularly, the techniques can be extended without undue experimentation to other varieties of digital elements, such as augmented reality images, virtual reality images, mixed reality images, etc., as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, audio data from one or more past conferences;
   generating, by the device, a prediction model that predicts when participants of a conference will speak based on the audio data from the one or more past conferences;
   predicting, by the device and using the prediction model, a speech distribution for participants of a particular conference, wherein the speech distribution indicates when and how long each participant will speak during the particular conference; and
   proactively optimizing, by the device, audio parameters of the particular conference based on its predicted speech distribution to prioritize audio output by a particular participant during the particular conference, wherein the particular participant is predicted to be a primary speaker during the particular conference.

2. The method as in claim 1, wherein the predicting of the speech distribution for the participants of the particular conference comprises:
   predicting, by the device, the speech distribution for the participants of the particular conference using the prediction model and one or more characteristics of the particular conference,
   wherein the one or more characteristics comprise one or more of: a date of the particular conference, a time of the particular conference, a title of the particular conference, a scheduling regularity of the particular conference, and a past attendance of the particular conference.

3. The method as in claim 1, wherein the generating of the prediction model that predicts when participants of a conference will speak further comprises:
   detecting, by the device, a speech distribution pattern that occurs in the one or more past conferences.

4. The method as in claim 1, wherein the generating of the prediction model that predicts when participants of a conference will speak further comprises:
   grouping, by the device, the participants of the particular conference into collaboration groups based on a participation of the participants in the one or more past conferences.

5. The method as in claim 1, further comprising:
   calculating, by the device, a speaking time for each of the participants of the particular conference during the one or more past conferences;
   predicting, by the device, the primary speaker during the particular conference based on the speaking time for each of the participants of the particular conference during one or more past conferences.

6. The method as in claim 1, further comprising:
   extracting, by the device, audio features from the one or more past conferences; and generating, by the device, an audio fingerprint for each of the participants of the particular conference using the audio features extracted from the one or more past conferences.

7. The method as in claim 6, wherein proactively optimizing of the audio parameters of the particular conference based on its predicted speech distribution comprises:
identifying, by the device, an overlapping audio feature for two or more of the participants of the particular conference based on the audio fingerprint for each of the participants; and
controlling, by the device, the audio parameters of the particular conference based on the overlapping audio feature.

8. The method as in claim 1, wherein proactively optimizing of the audio parameters of the particular conference based on its predicted speech distribution comprises:
determining, by the device, a speaking schedule indicating when each of the participants of the particular conference is predicted to speak during the particular conference based on the speech distribution; and
controlling, by the device, the audio parameters of the particular conference according to the speaking schedule.

9. The method as in claim 1, further comprising:
selecting, by the device, an audio filter based on the speech distribution of the particular conference; and
applying, by the device, the audio filter during the particular conference.

10. An apparatus, comprising:
a network interface to communicate with a computer network;
a processor coupled to the network interface and configured to execute one or more processes; and
a memory configured to store a process that is executed by the processor, the process when executed configured to:
obtain audio data from one or more past conferences;
generate a prediction model that predicts when participants of a conference will speak based on the audio data from the one or more past conferences;
predict, using the prediction model, a speech distribution for participants of a particular conference, wherein the speech distribution indicates when and how long each participant will speak during the particular conference; and
proactively optimize audio parameters of the particular conference based on its predicted speech distribution to prioritize audio output by a particular participant during the particular conference, wherein the particular participant is predicted to be a primary speaker during the particular conference.

11. The apparatus as in claim 10, wherein the apparatus predicts the speech distribution for the participants of the particular conference by:
predicting the speech distribution for the participants of the particular conference using the prediction model and one or more characteristics of the particular conference,
wherein the one or more characteristics comprise one or more of: a date of the particular conference, a time of the particular conference, a title of the particular conference, a scheduling regularity of the particular conference, and a past attendance of the particular conference.

12. The apparatus as in claim 10, wherein the apparatus generates the prediction model that predicts when participants of a conference will speak by:
detecting a speech distribution pattern that occurs in the one or more past conferences.

13. The apparatus as in claim 10, wherein the apparatus generates the prediction model that predicts when participants of a conference will speak by:
grouping the participants of the particular conference into collaboration groups based on a participation of the participants in the one or more past conferences.

14. The apparatus as in claim 10, wherein the process when executed is further configured to:
calculate a speaking time for each of the participants of the particular conference during the one or more past conferences;
predict the primary speaker during the particular conference based on the speaking time for each of the participants of the particular conference during one or more past conferences.

15. The apparatus as in claim 10, wherein the process when executed is further configured to:
extract audio features from the one or more past conferences; and
generate an audio fingerprint for each of the participants of the particular conference using the audio features extracted from the one or more past conferences.

16. The apparatus as in claim 15, wherein the apparatus proactively optimizes the audio parameters of the particular conference based on its predicted speech distribution by:
identifying an overlapping audio feature for two or more of the participants of the particular conference based on the audio fingerprint for each of the participants; and
controlling the audio parameters of the particular conference based on the overlapping audio feature.

17. The apparatus as in claim 16, wherein the apparatus proactively optimizes the audio parameters of the particular conference based on its predicted speech distribution by:
determining a speaking schedule indicating when each of the participants of the particular conference is predicted to speak during the particular conference based on the speech distribution; and
controlling the audio parameters of the particular conference according to the speaking schedule.

18. A tangible, non-transitory, computer-readable medium storing program instructions that cause a device to execute a process comprising:
obtaining, by the device, audio data from one or more past conferences;
generating, by the device, a prediction model that predicts when participants of a conference will speak based on the audio data from the one or more past conferences;
predicting, by the device and using the prediction model, a speech distribution for participants of a particular conference, wherein the speech distribution indicates when and how long each participant will speak during the particular conference; and
proactively optimizing, by the device, audio parameters of the particular conference based on its predicted speech distribution to prioritize audio output by a particular participant during the particular conference, wherein the particular participant is predicted to be a primary speaker during the particular conference.

* * * * *

UNITED STATES PATENT AND TRADEMARK OFFICE
CERTIFICATE OF CORRECTION

PATENT NO. : 11,689,666 B2
APPLICATION NO. : 17/355352
DATED : June 27, 2023
INVENTOR(S) : Derek Engi et al.

Page 1 of 1

It is certified that error appears in the above-identified patent and that said Letters Patent is hereby corrected as shown below:

In the Specification

Column 12, Line 63, please amend as shown:
(810a), Derek (810d), Gonzalo (810f), and Ivan (810h), as Column 17, Line 38, please amend as shown:
of the embodiments herein.

Signed and Sealed this
Twenty-sixth Day of September, 2023

Katherine Kelly Vidal
*Director of the United States Patent and Trademark Office*